United States Patent Office 3,437,708
Patented Apr. 8, 1969

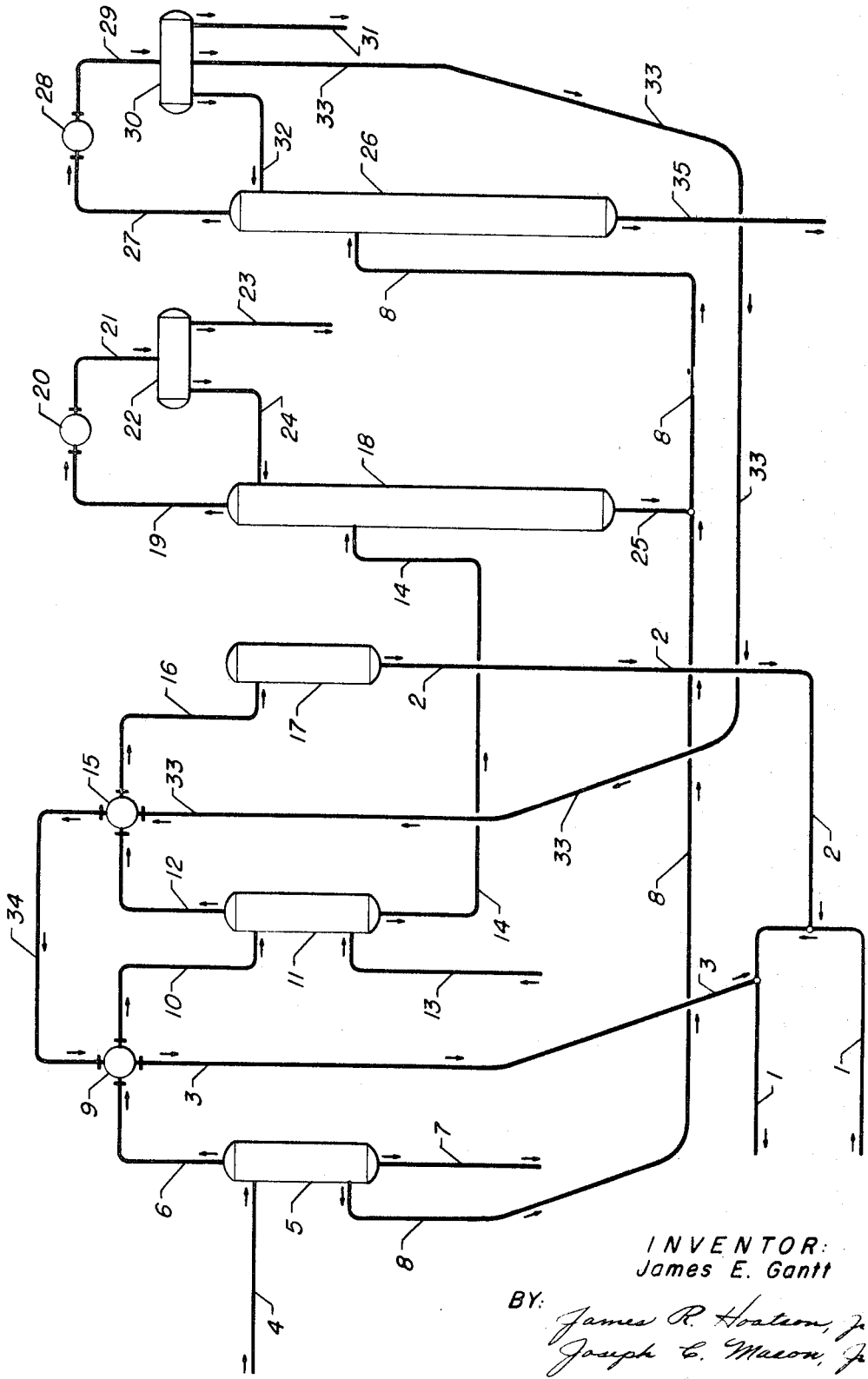

3,437,708
SEPARATION PROCESS FOR ALKYLATED
AROMATIC COMPOUNDS AND OLEFINIC
OLIGOMERIZATON PRODUCTS
James E. Gantt, Elmwood Park, Ill., assignor to Universal
Oil Products Company, Des Plaines, Ill., a corporation
of Delaware
Filed Sept. 12, 1967, Ser. No. 670,514
Int. Cl. C07c 7/04
U.S. Cl. 260—671                    13 Claims

ABSTRACT OF THE DISCLOSURE

Process for separating a reaction zone effluent containing at least three components which comprises passing the effluent to a flash zone, passing the resulting flash vapor to a partial condensing zone, recycling the resulting vapor component from the partial condensing zone to the reaction zone, passing the resulting flash zone liquid and the resulting partial condensing zone liquid to a fractionation zone, separating the liquids therein to provide at least a first liquid component and a second liquid component, recycling a part of the first liquid component to the reaction zone, and recovering the second liquid component. The process is particularly applicable to the recovery of alkylated aromatic compounds such as cumene and to recovery of oligomerized products such as propylene-trimer.

*Field of invention*

The present invention relates to a separation process for recovery of product from a reaction zone effluent containing at least three components. The present invention particularly relates to the separation of the effluent from an alkylation reaction zone to provide a diluent stream for return to the reaction zone, a reactant stream for return to the reaction zone, and a product stream of alkylated aromatic compound. The inventive process also relates to the separation of the effluent from an oligomerization reaction zone to provide a diluent stream for return to the reaction zone, a stream of partially-oligomerized product for return to the reaction zone, and a product stream of oligomerized product. Most particularly the present invention relates to a method of separation which results in an improved process for alkylation of benzene with a propylene-propane mixture, for the alkylation of benzene with an ethylene-ethane mixture, for the oligomerization of propylene in a propylene-propane mixture, and for the co-oligomerization of propylene and butene in a reactive mixture containing propane and butane.

The present invention finds one broad application in the production of alkylated aromatic hydrocarbons for use in subsequent chemical synthesis. The present invention particularly finds application in the production of isopropylbenzene, or cumene, which is utilized in the synthesis of phenol, acetone, alpha-methylstyrene, and acetophenone. These cumene-derived chemicals are intermediates in the synthesis of resins for plastics and nylon. A further application of the inventive process is in the synthesis of ethylbenzene. Virtually all of the ethylbenzene commercially produced is dehydrogenated to styrene monomer, although small quantities are used as solvents and as intermediates in the synthesis of other chemicals. Ethylbenzene-derived styrene finds utility in the synthesis of polyester resins, polystyrene and other plastics, as well as in the synthesis of styrene-butadiene rubber and in the formulation of coatings including latex paints.

Application of the inventive process may also be found in the alkylation of substituted aromatics such as phenol, which when alkylated with isobutylenes forms O-tertiary-butylphenol which is an intermediate in the synthesis of other chemicals, and forms p-tertiarybutylphenol which is used to modify phenolformaldehyde resins. A further application of the inventive process upon substituted aromatic hydrocarbons may be found in the alkylation of para-hydroxyanisole with tertiary butyl alcohol or iso-butylene to form butylated hydroxyanisole which finds utility as an antioxidant in the preservation of foods.

The present invention finds additional application in the obligomerization of olefin-acting compounds. Oligomerization of propylene may be undertaken to produce commercial fractions of propylene-trimer and propylene-tetramer, within the scope of the inventive process. Trimer finds utility in the synthesis of nonyl-phenol detergents and in the synthesis of decyl alcohols by the Oxo Process. Tetramer is also used in the synthesis of detergents. The inventive process also finds application in the synthesis of commercial fractions of heptene which are produced by the co-oligomerization of propylene and butenes in a reaction mixture comprising propylene, propane, butene, and butane. Heptene is utilized in the synthesis of octyl alcohols by the Oxo Process. (It is to be noted that oligomerization of olefin hydrocarbons is more commonly referred to as "polymerization of olefins" in the petroleum refining industry.)

*Description of the prior art*

As indicated above, the present invention particularly relates to the recovery of isopropylbenzene, or cumene from an alkylation reaction effluent. In the commercial manufacture of cumene it is the art to charge benzene and propylene into a reactor containing a solid phosphoric acid catalyst.

Because it is desired to minimize the dialkylation of benzene which produces di-isopropylbenzene by-product, it is the art to have a molar deficiency of propylene in the reaction zone and normally this deficiency is provided by maintaining the ratio of benzene to propylene at about 8:1. The resulting alkylation effluent which leaves the reaction zone will therefore contain about seven moles of unreacted benzene per mole of product cumene, and the excess benzene must be separated from the effluent and recycled to the reaction zone in conjunction with the fresh benzene feed which is charged to the process.

The propylene reactant which is typically charged to the process will contain unreactive diluent comprising propane with traces of ethane and butane. When the propylene feed is derived from a Pyrolysis Plant these diluents will normally be less than 10 mole percent, while a propylene feed derived from the gas recovery unit of a Fluid Catalytic Cracking Plant will often contain as much as 35 to 40 mole percent of unreactive diluents. In addition to the unreactive propane diluent which is inherent in the propylene feed, it is typically the art to introduce additional propane diluent into the reaction zone to provide a thermal quench for the exothermic alkylation reaction in order that the catalyst temperature may be controlled at the desired level. This propane quench may be introduced into the reactor at elevated temperature with the propylene-propane fresh feed, or it may be introduced at elevated temperature or at ambient temperature into the reaction zone at several intermediate quench points between several catalyst beds. The alkylation effluent which leaves the typical reaction zone therefor contains a considerable amount of propane diluent. This diluent must be separated from the effluent in order that a portion may be recycled to the reaction zone and in order that a quantity may be withdrawn from the process. The quantity withdrawn is equivalent to the quantity which is being introduced into the process in the propylene-propane feed, and it must be withdrawn from the process in order to avoid accumulation of unreactive diluents in the process unit.

It is the art in the manufacture of cumene to charge the alkylation effluent to a fractionation train comprising a depropanizer column, a benzene column, and a cumene column. The effluent enters the depropanizer wherein the propane diluent is removed overhead to provide the propane recycle stream for return to the reaction zone and a net propane product stream which is normally withdrawn to the fuel gas system or sent to produce storage as liquefied petroleum gas (LPG). The bottoms liquid from the depropanizer passes into the benzene column which produces a benzene overhead stream. Part of the benzene produced provides the required recycle to the reaction zone and a second part is withdrawn from the process in order to avoid the accumulation of nonaromatic contaminants which enter the process as trace constituents in the benzene feed. The benzene column bottoms pass to a cumene column which produces an overhead comprising high purity cumene product and a bottoms by-product comprising polyalkylated benzene.

The inventive separation process is equally applicable in the oligomerization of an olefin-acting compound in the presence of an unreactive diluent wherein a desired oligomerized product is produced and partially-oligomerized product must be separated therefrom. For example, in the production of propylene-tetramer a typical propylene-propane feed is oligomerized over a solid phosphoric acid catalyst to produce a reactor effluent usually comprising propane, propylene-dimer, propylene-trimer, propylene-tetramer and propylene-pentamer. It is therefore necessary to depropanize the reactor effluent in order to provide a recycle diluent propane stream for catalyst temperature control and to recycle the propylene-dimer and propylene-trimer to the reaction zone for further oligomerization with propylene to produce additional product propylene-tetramer. It is well known to those skilled in the art, that the required separation of the reactor effluent is accomplished by passing the effluent into a series of fractionating columns comprising a depropanizer column, a column for obtaining the desired recycle fraction of partially-oligomerized product, and a column for recovery of the desired oligomerized product.

The inventive process is similarly applicable to the separation of the reactor effluent resulting from the synthesis of heptene by co-oligomerization of propylene and butenes. The unreactive diluent which must be recycled to the reactor for temperature control normally comprises a mixture of propane and butane. Because the olefinic feed contains propylene, butenes, and possible traces of other olefins, the reactor effluent will contain hexenes, heptenes, octenes, and heavier oligomerization products. It is the art to recover heptenes and octenes as the product fraction and to recycle hexenes and lighter olefins for additional oligomerization. It is well known to those skilled in the art that this separation of the oligomerization reactor effluent is accomplished in a series of fractionating columns which are operated in a conventional manner.

*Summary of the invention*

It is an object of the present invention to provide a method for the separation of a process stream containing at least three components. It is a further object of the present invention to provide a process for the separation of a reaction zone effluent. It is a particular object of the present invention to provide a separation process for the recovery of alkylated aromatic compounds from the effluent of an alkylation reaction zone and for the recovery of oligomerized products from the effluent of an oligomerization reaction zone. It is a specific object of this invention to produce ethylbenzene, cumene, heptene, propylene-trimer, and propylene-tetramer in a more economical and facile manner.

These and other objectives will be readily ascertained from the following description and the attached drawing which is a simplified flow diagram setting forth one specific embodiment of the invention.

In accordance with these objectives, a broad embodiment of this invention may be characterized as a process for separating a reaction zone effluent containing at least three components which comprises passing the effluent from a reaction zone into a flash zone maintained under separation conditions; withdrawing from the flash zone a first fraction comprising a first component and a first part of a second component and a second fraction comprising a second part of the second component and a third component; passing the first fraction into a partial condensing zone maintained under separation conditions; withdrawing from the partial condensing zone a third fraction comprising the first component and a second fraction comprising the first part of the second component; passing the second fraction and the fourth fraction into a separation zone under conditions sufficient to provide at least a fifth fraction comprising the second component and a sixth fraction comprising the third component in high concentration; passing the third fraction and at least a part of the fifth fraction into the reaction zone; and, recovering the sixth fraction.

A particular embodiment of the present invention may be characterized by this separation process wherein the reaction zone comprises an alkylation reaction zone, the first component comprises an unreactive diluent, the second component comprises an alkylatable aromatic compound, and the third component comprises an alkylated aromatic compound.

A further particular embodiment of the present invention may be characterized by this separation process wherein the reaction zone comprises an oligomerization reaction zone, the first component comprises an unreactive diluent, the second component comprises partially-oligomerized product, and the third component comprises oligomerized product.

In a more specific embodiment of the inventive process as defined in the three broad embodiments above, the partial condensing zone contains heat exchanger means wherein at least a portion of the fifth fraction is introduced as cooling medium before passing into the reaction zone.

These and other more specific embodiments will be more clearly set forth hereinafter.

Many aromatic compounds are utilizable as alkylatable aromatic compounds within the process of this invention. The preferred aromatic compounds are aromatic hydrocarbons, including monocyclic aromatics, polycyclic aromatics, and alkylaromatics, but substituted aromatic hydrocarbons are equally suitable. Such aromatic compounds as phenol, cresol, and hydroxyanisole are among the substituted aromatic hydrocarbons which may be alkylated to produce an effluent for separation within the scope of the inventive process.

Of the alkylatable aromatic compounds suitable for use within the process of this invention the monocyclic aromatic hydrocarbons are preferred and benzene is particularly preferred.

The olefin-acting compound or alkylating agent which may be processed within a reaction zone to yield an effluent suitable for separation within the embodiments of the inventive process, may be selected from the diverse materials including mono-olefins, diolefins, polyolefins, acetylenic hydrocarbons, alcohols, ethers and esters. Among the esters which are utilizable are alkylhalides, alkylsulfates, alkylphosphates, and various esters of carboxylic acids.

The preferred olefin-acting compounds are olefinic hydrocarbons and particularly preferred are the mono-olefins. Mono-olefins which are utilized as olefin-acting compounds in the process of the present invention may be either normally gaseous or normally liquid at ambient temperature and include ethylene, propylene, 1-butenes, 2-butenes, isobutylene, and higher molecular weight normally liquid olefins.

Also included within the scope of the olefin-acting alkylating agent or olefin-acting compound are certain substances capable of producing olefinic hydrocarbons or intermediates thereof under the conditions of operation utilized within an alkylation raction zone or an oligomerization reaction zone. Typical olefin producing substances or olefin-acting compounds capable of use include alkylhalides capable of undergoing dehydrohalogenation to form olefinic hydrocarbons, and alcohols capable of undergoing dehydration to produce olefinic hydrocarbons.

The alkylation of the alkylatable aromatic compound with the olefin-acting compound or alkylating agent will normally be undertaken in the reaction zone in the presence of an alkylation catalyst under suitable operating conditions. The operating conditions of temperature, pressure and reaction time will vary depending upon the composition of the catalyst and the type of olefin-acting compound and alkylatable aromatic compound being processed. Typical operating conditions will be set forth hereinafter. The acid-acting catalyst may be selected from various materials such as sulfuric acid, phosphoric acid, hydrogen fluoride, aluminum chloride, aluminum bromide, boron trifluoride, ferric chloride, zinc chloride, zirconium chloride, various synthetically prepared cracking catalysts, such as silica-alumina, silica-alumina-zirconia, silica-magnesia, and various acid-acting clays including activated alumina. A particularly preferred catalyst which is utilized for the alkylation of aromatics within the practice of this invention is solid phosphoric acid catalyst which is a calcined composite of phosphoric acid and a siliceous absorbent. Another preferred catalyst utilized for alkylation of aromatics within the inventive proces comprising a complex of boron trifluoride with alumina. A further preferred catalyst comprises a composite of silia-alumina.

The oligomerization of olefin-acting compounds is also undertaken in the reaction zone in the presence of an acid-acting catalyst. Suitable operating conditions of temperature, pressure, and residence time will vary depending upon the specific catalyst being used and the type of olefin-acting compound being reacted as will be set forth hereinafter. The acidic catalysts which have been defined hereinabove for the alkylation of aromatic compounds with olefin-acting compounds are equally effective for the oligomerization of olefin-acting compounds. A particularly preferred catalyst which is utilized for the oligomerization of olefin-acting compounds within the practice of this invention is solid phosphoric acid catalyst which is a calcined composite of phosphoric acid and a siliceous absorbent.

An understanding of the present invention may now be readily obtained by referring to the accompanying drawing which sets forth a simplified flow for carrying out one specific example wherein the process of the present invention is practiced.

*Drawing and example*

As previously noted, the particularly preferred embodiment of this invention comprises the inventive process wherein the alkylatable aromatic compound is benzene, the olefin-acting alkylating agent is propylene, the unreactive vapor diluent is propane, and the desired monoalkylated aromatic compound is high purity cumene. Referring now to the drawing, a propylene-propane feed mixture enters the process via line 1 at the rate of 1676.3 moles per hour, at a pressure of about 640 p.s.i.g. and a temperature of about 170° F. This propylene-propane feed contains 48.8 mole percent propylene and is augmented by a propane recycle stream entering line 1 via line 2 at the rate of 943.6 moles per hour and at a temperature of 165° F. from a source to be specified hereinafter. This total combined propylene-propane stream continues in line 1 and is further augmented by a benzene recycle stream which enters line 1 via line 3, from a source also to be specified hereinafter, at the rate of 6704.7 moles per hour and at a temperature of 290° F. The resulting combined feed stream then passes via line 1 at 260° F. into an alkylation reaction zone which is not shown. The combined feed of 9324.6 moles per hour enters the reactor system at 640 p.s.i.g. and is preheated therein to 380° F. before contacting solid phosphoric acid catalyst.

A resulting alkylation effluent leaves the reaction zone and enters the inventive process via line 4 at a pressure of about 525 p.s.i.g. and a temperature of about 435° F. This stream comprising 8505.4 moles per hour is introduced into a flash chamber 5 at 250 p.s.i.g. and 385° F. This alkylation effluent is separated therein into vapor and liquid phases. A part of the liquid phase is removed from the flash chamber via line 7 and comprises a phosphoric acid solution which is leached off of the catalyst in the reaction zone. This stream normally comprises about one gallon of concentrated phosphoric acid per day and is sent to a disposal system not shown. The major portion of the flash liquid comprising 4051.1 moles per hour of benzene, cumene, and heavier alkylbenzene, leaves the chamber 5 via line 8 and is sent to fractionation which will be specified hereinafter.

The flash vapor comprising propane, benzene, and a small quantity of cumene, leaves the chamber 5 at 250 p.s.i.g. and 385° F. at a rate of 4454.3 moles per hour via line 6 and passes through a heat exchanger 9 wherein the vapor is partially condensed by a cooling medium to be specified hereinbelow. The resulting condensate and vapor passes into separator 11 via line 10 at 235 p.s.i.g. and 325° F. The resulting vapor leaves the condensate separator 11 via line 12 and comprises 943.6 moles per hour. This benzene-containing vapor stream comprising propane enters a condenser 15 at 235 p.s.i.g. and 325° F. wherein it is condensed to the liquid phase by a cooling medium to be specified hereinafter. The condensed liquid propane is passed via line 16 into receiver 17 at 225 p.s.i.g. and 165° F. The liquid propane which has been collected in receiver 17 is removed by a pump, not shown, and sent to line 1 via line 2 at 640 p.s.i.g. as the propane recycle stream disclosed above.

Fresh make-up benzene which is required for the alkylation process is introduced into the cumene process unit via line 13 and enters the separator 11 at 235 p.s.i.g. and 270° F. This fresh benzene is introduced into the process at this point at the rate of 812.2 moles per hour in order that it may mix with the partially condensed liquid and pass via line 14 to the depropanizer column 18 for removal of any trace water which may be in the fresh benzene. The trace water is detrimental to proper catalyst hydration control in the alkylation reactor, and it is the art to provide for drying of the fresh benzene feed in the depropanizer column.

A resulting total depropanizer feed of 4322.9 moles per hour leaves separator 11 via line 14 and enters the depropanizer column 18 at 235 p.s.i.g. and 322° F. The depropanizer column sends a propane vapor overhead via line 19 at the rate of 3193.4 moles per hour and at the pressure of 230 p.s.i.g. into a condenser 20 at 120° F. The propane vapor is condensed therein and cooled to 100° F. before passing via line 21 into receiver 22. Reflux for the depropanizer column is sent from separator 22 into the top of column 18 via line 24 at the rate of 2338.0 moles per hour. A net propane overhead product leaves separator 22 via line 23 at the rate of 855.4 moles per hour. This net propane product is equivalent to the unreactive constituents which enter the inventive process in the propylene-propane feed at line 1, and is sent to LPG Product Storage or to a fuel gas system.

A net depropanizer bottoms stream comprising benzene and cumene leaves the bottom of column 18 via line 25 at the rate of 3467.5 moles per hour at a pressure of 235 p.s.i.g. and a temperature of 425° F. This stream enters line 8 where it is mixed with the hot flash liquid which leaves flash chamber 5 at a rate of 4051.1 moles per hour, as noted hereinabove. The flash liquid in line 8 is at a pressure of 230 p.s.i.g., and a temperature of 385° F., and mixes with the depropanizer bottoms stream to yield a total hot liquid stream which continues in line 8 at the rate of 7518.6 moles per hour. This hot liquid passes into a benzene column 26 at a pressure of 20 p.s.i.g. and a temperature of 250° F.

A benzene vapor overhead stream leaves the top of the benzene fractionator via line 27 at 15 p.s.i.g. and 230° F. This vapor stream of 9927.7 moles per hour enters condenser 28 wherein it is condensed and cooled to 100° F. The liquid benzene then enters receiver 30 via line 29. A benzene reflux stream is returned to the benzene tower via line 32 at the rate of 3190.0 moles per hour. A net benzene product is removed from receiver 30 via line 31 and sent to storage at the rate of 33.0 moles per hour. This net benzene product comprises benzene and non-aromatic contaminants which have entered the process as trace non-aromatics in the fresh benzene feed or in the propylene-propone feed. A total recycle benzene stream also leaves separator 30 and passes via line 33 at the rate of 6704.7 moles per hour into condenser 15.

This recycle benzene stream which enters condenser 15 at 100° F. provides the specified cooling medium for condensing the propane vapor. The benzene recycle leaves condenser 15 at 160° F. via line 34 and enters partial condenser 9, wherein it provides the specified cooling medium for partially condensing the flash vapor. The recycle benzene then leaves partial condenser 9 at 290° F. and passes into line 1 via line 3 as the recycle benzene stream specified previously.

A benzene column bottoms stream comprising cumene and heavier alkylbenzene leaves the benzene column via line 35 at 780.9 moles per hour and at 375° F. This stream passes into a cumene column, not shown, wherein the benzene column bottoms is fractionated to provide 744.4 moles per hour of high purity cumene product and 36.5 moles per hour of heavy alkylbenzene by-product.

Several important advantages of the inventive process may be readily ascertained from the foregoing process description.

The first advantage which will be readily seen is that the depropanizer column of the inventive process is reduced in size by about fifty percent. Whereas the total reactor effluent of 8505.4 moles per hour would be charged to the column under the prior art, in the present invention only 4322.9 moles per hour is fed to the column. More than half of the benzene, cumene, and polyalkylbenzene of the effluent by-passes the column as the flash liquid. In addition, none of the propane recycle passes through the column on its return to the reaction zone. The column diameter may be significantly reduced due to this reduced loading, and the overhead condensing system and the reboiler system are accordingly reduced in size. The net result is that the present invention yields a considerable savings in the capital cost of the depropanizer fractionator.

There is also a reduction of operating cost for the cumene plant due to the reduction of utilities which are required at the depropanizer column. Since more than half of the benzene and cumene by-passes the column, the sensible heat required to elevate the flash liquid to the reboiler temperature is saved. In addition, there is a considerable saving of heat input at the depropanizer because the recycle propane does not pass through the column. If the propane recycle passed into the column, a considerable addition of reflux would be required in order to make high purity propane recycle. The propane product which leaves the column via line 23 must be benzene-free for use as fuel gas or LPG. The propane recycle may be allowed to contain considerable amounts of benzene, however, since it is also necessary to recycle benzene to the alkylation reactor. If the propane recycle is passed through the depropanizer it is forced to meet the purity specification of the product propane, thus adding reflux and utilities expense with no beneficial result to the process. The present invention eliminates this wasteful utility cost.

There is an additional savings in operating cost in the inventive process. The recycle benzene which must be returned to the reaction zone must be heated to reaction temperature. A part of this heating is accomplished by passing the cold benzene through condenser 15 and through partial condenser 9. Not only is the benzene heated to 290° F. by this system, but it provides the cooling medium for these exchangers and thus reduces cooling water requirements for the cumene plant.

Similarly it will be seen that in the particular embodiment described above, the recycle propane stream is returned to the reaction zone in admixture with the propylene and benzene in the combined feed stream. The recycle propane must therefore be preheated to reaction temperature and if the recycle propane were derived from the depropanizer column the recycle propane would require temperature elevation from 100° F. By the practice of the present invention, however, the propane recycle requires temperature elevation from 165° F., thus resulting in a reduction of utility expense.

Other advantages in addition to those set forth hereinabove will be apparent to those skilled in the art.

While the embodiment set forth has been specific to the manufacture of cumene by the inventive process, it must be realized that the present invention is also applicable to the manufacture of other alkylated aromatic hydrocarbons such as ethylbenzene. The inventive process may also be found to be effective in the separation of the effluent from the synthesis of other alkylated aromatic compounds, such as alkylphenols, in the presence of an unreactive vapor diluent.

It is to be noted that the operating condition as set forth in the example are specific to that example and are no way to be construed as limiting upon the process.

In the alkylation of aromatic compounds with an olefin-acting compound it is the art to provide a molar deficiency of the olefin. The molar deficiency of olefin-acting compound to alkylatable aromatic is maintained by holding an aromatic to olefin molar ratio in the range of from 2:1 to about 30:1 with a preferred range of 4:1 to about 16:1. This molar deficiency is required in order to minimize polyalkylation of the aromatic compound. When utilizing a solid phosphoric acid catalyst in the reaction zone, it is particularly preferred that the ratio of aromatic to olefin should be about 8:1 when producing cumene and about 12:1 when producing ethylbenzene.

The amount of unreactive vapor diluent, propane in cumene synthesis and ethane in ethylbenzene synthesis, which is recycled to the reaction zone will vary as required to maintain the catalyst temperature at the desired level. The temperature of the reaction zone may be from 300° F. to about 600° F., and when utilizing a solid phosphoric acid catalyst will normally range from 350° F. to 450° F. for cumene and 450° F. to 550° F. for ethylbenzene. The pressure of the alkylation reaction may be from 300 pounds per square inch to 1000 pounds per square inch or even higher. The liquid hourly space velocity of the total combined feed to the reaction zone may range from 0.5 to 5.0, but will normally be in the range of 1.0 to 1.5. The specific reactor operating conditions which are required for the alkylation of any aromatic hydrocarbon or other alkylatable aromatic compound when utilizing a solid phosphoric acid catalyst or any other catalyst are readily ascertainable by those skilled in the art.

It must be noted that the flash zone 5 was maintained at 385° F. and 250 p.s.i.g. in the example given, but that these conditions are specific to the example. The conditions of temperature and pressure are adjusted to give the desired separation between liquid and vapor in the effluent. Preferably, these conditions will provide that about half of the benzene in the reactor effluent will flash into the vapor phase and half will remain in the liquid phase. However, the liquid-vapor split may be shifted up or down as desired by choice of the operating conditions, provided that substantially all of the unreactive vapor diluent is in the vapor phase. Thus, it is within the scope of the process of the present invention that the flash vapor will contain substantially all of the unreactive vapor diluent (propane) and that it may contain from about 10% to about 90% of the unreacted benzene while the flash liquid may correspondingly contain from about 90% to about 10% of the benzene.

The primary control of the separation of the effluent into liquid and vapor is the amount of pressure drop to which the effluent is subjected upon leaving the reaction zone and entering the flash zone. As noted above, it is preferable that the pressure drop, or flashing, should provide that about half of the benzene is in the vapor phase and half is in the liquid phase. Although the alkylation reaction may occur at pressures in excess of 1000 p.s.i.g., little or no flashing of vapor would occur at such pressure in the flash zone and since the cost of fabricating the vessel for the flash zone would be excessive at such a pressure level it is advantageous to keep the pressure at about 500 p.s.i.g. or below. Since the vapor leaving the flash zone must enter a partial condensing system in order to provide a liquid feed for the subsequent fractionating column operating under elevated pressure, a depropanizer for cumene synthesis, or a deethanizer for ethylbenzene synthesis, it is important not to operate the flash zone at a pressure which is below the pressure of the subsequent column. Thus, while the flash zone 5 could be maintained at a pressure in the range of from about 50 p.s.i.g. to 200 p.s.i.g. this would require that the flash vapor be partially condensed and that the condensate then be pumped into the fractionating column. It must also be noted that if flash zone 5 were operated at such a low pressure level, additional pumping power would be required to pump the liquefied propane out of receiver 17 and back to the reactor. Therefore, the pressure within the flash zone should be maintained in the range of from 200 p.s.i.g. to about 500 p.s.i.g., and it is preferable that the pressure only be sufficiently high to transfer the condensed liquid via line 14 into the subsequent column 18 without mechanical assistance. Thus, it is preferable that the flash zone be maintained at a pressure of from about 200 p.s.i.g. to 500 p.s.i.g., and more specifically that the pressure be maintained at from 200 p.s.i.g. to about 300 p.s.i.g. when applied to cumene production.

The temperature within the flash zone will be the flash point of the reactor effluent for the specific reactor effluent composition and for the specific pressure within the flash zone. The temperature will always be below the reactor outlet temperature since the flashing of the effluent will cause a substantially adiabatic temperature drop. The temperature within the flash zone will, therefore, normally be in the range of from about 250° F. to about 500° F., and will preferably be in the range of from 300° F. to about 425° F. for cumene production.

The degree of cooling which is imposed upon the flash vapor in the partial condenser 9 will be varied as required to provide the desired separation between the propane vapor which is subsequently condensed for recycle to the reactor, and the net liquid which is charged to the depropanizer column. In the specific embodiment of the example, the flash vapor was cooled from 385° F. to 325° F. to yield a net propane vapor of 943.6 moles per hour and a net condensed depropanizer liquid feed of 3510.7 moles per hour. If additional propane recycle were desired, a part of the recycle benzene cooling medium which enters the partial condenser 9 via line 34 could by-pass this exchanger, thus increasing the temperature and providing more propane and benzene in the vapor phase. Similarly, if additional cooling is provided at exchanger 9 the temperature will be lowered sufficiently to provide less propane and benzene vapor for subsequent return to the reaction zone as propane recycle. The temperature level within the partial condensing zone will be controlled, typically, between 250° F. and 500° F. and will preferably be in the range of from 300° F. to 425° F. The pressure level within the partial condensing zone will be controlled within the limits prescribed hereinabove for the flash zone, since the processing problems discussed therein apply with equal force to the partial condensing zone.

It should be noted that the foregoing discussion concerning the operating conditions required within the flash zone and partial condensing zone are particularly applicable to the separation of an effluent wherein the subsequent fractionation columns are operated at superatmospheric and atmospheric pressures. It is well known, however, that in alkylating substituted aromatic compounds it is often necessary to fractionate the effluent in a train of columns maintained at subatmospheric pressure. A typical example of such subatmospheric separation is found in the production of butylated hydroxyanisole from the effluent which results in alkylating p-hydroxyanisole with tertiary butyl alcohol. When the flash zone and partial condensing zone preceed the subatmospheric fractionation train, they may be maintained at superatmospheric or subatmospheric pressure as may be required to accomplish the particular degree of separation which may be desired.

The specific operating conditions within the flash zone and partial condensing zone for any given reactor effluent composition are readily ascertainable by those skilled in the art utilizing the teachings which have been presented hereinabove.

It is to be noted that the fractionation section of the example comprises a depropanizer column and a benzene column. The operating conditions within these fractionation columns are specific for the process set forth in the example, and the operating conditions which may be necessary for any other reactor effluent composition will be readily ascertainable by those skilled in the art. It is not therefore necessary within the description of this invention to discuss broad ranges which are required for such fractionation columns or for the cumene column which is required in the overall process but which was not shown in the drawing.

It must also be noted that in the example set forth, a solid phosphoric acid catalyst was used in reaction zone for alkylation of the aromatic. Since aromatic hydrocarbons leach water and phosphoric acid from such catalyst, provision must therefore be made for removal of concentrated phosphoric acid as indicated via line 7. Where other catalyst systems are used in the inventive process such provision for acid removal from the flash chamber and from the process may not be necessary.

It will be readily seen that the inventive separation process as set forth in the drawing and example above, wherein cumene is recovered from an aromatic-alkylation reactor effluent, is equally applicable to the separation of an effluent from an oligomerization reactor as, for example, in the recovery of propylene-trimer, propylene-tetramer, or heptene fractions. Those skilled in the art will perceive that partially-oligomerized product will be returned to the reaction zone via line 33 for further reaction with olefin to produce the desired fully oligomerized product in the reaction zone, while the unreactive diluent is returned via line 2 to provide the desired thermal quench in the reaction zone. The benfits which accrue to the cumene process by utilization of the inventive separation process are, therefore, equally realized when applying the present invention to the synthesis of commercial heptene fractions, propylene-trimer, and propylene-tetramer.

The reactor conditions which are required for the synthesis of heptene and of propylene-trimer and tetramer fractions are well known in the art and it is not necessary to detail them herein. The conditions which are indicated hereinabove for the alkylation of aromatic hydrocarbons in the presence of solid phosphoric acid catalyst are generally applicable to the oligomerization of olefins, with the exception that the temperature in the reaction zone may be held at a higher level.

Since the reactor effluent composition will be dependent upon the ratio of olefin to paraffinic diluent in the reactor feed and the degree of oligomerization in the reactor, as effected by the specific operating conditions in the reaction zone, it is not possible to set forth specific operating conditions for a flash zone and partial condensing zone as applied to an oligomerization process. The necessary conditions, however, are readily ascertainable by those skilled in the art by discriminately utilizing the teachings which have been presented hereinabove in reference to the operating conditions which are utilizable and which are preferable in the synthesis of cumene.

*Preferred embodiments*

From the foregoing it may be summarized that a preferred embodiment of the present invention is a process for the recovery of cumene which comprises passing a total alkylation effluent comprising propane, benzene, and cumene, from an alkylation reaction zone into a flash zone maintained at a pressure in the range of from 200 p.s.i.g. to 300 p.s.i.g. and a temperature in the range of from 300° F. to 425° F.; withdrawing from the flash zone a first fraction of vapor comprising propane and benzene, and a second fraction of liquid comprising benzene and cumene passing the first fraction into a partial condensing zone maintained at a pressure in the range of from 200 p.s.i.g. to 300 p.s.i.g. and at a temperature in the range of from 300° F. to 425° F.; withdrawing from the partial condensing zone a third fraction comprising propane vapor and a fourth fraction comprising benzene liquid; passing the second fraction and the fourth fraction into a fractionation zone under conditions sufficient to provide at least a fifth fraction comprising benzene and a sixth fraction comprising cumene in high concentration; passing the third fraction and at least a part of the fifth fraction into the reaction zone; and recovering he sixth fraction.

It may be further noted that a particularly preferred embodiment of the present invention comprises the embodiment disclosed in the paragraph immediately above, wherein the partial condensing zone contains heat exchanger means wherein at least a portion of said part of the fifth fraction is introduced as cooling medium before passing into the reaction zone.

The invention claimed:

1. Process for separating a reaction zone effluent containing at least three components which comprises the steps of:
   (a) passing said effluent from a reaction zone into a flash zone maintained under separation conditions;
   (b) withdrawing from said flash zone a first fraction comprising a first component and a first part of a second component, and a second fraction comprising a second part of said second component and a third component;
   (c) passing said first fraction into a partial condensing zone maintained under separation conditions;
   (d) withdrawing from said partial condensing zone a third fraction comprising said first component and a fourth fraction comprising said second component;
   (e) passing said second fraction and said fourth fraction into a separation zone under conditions sufficient to provide at least a fifth fraction comprising said second component and a sixth fraction comprising said third component in high concentration;
   (f) passing said third fraction and at least a part of said fifth fraction into said reaction zone; and,
   (g) recovering said sixth fraction.

2. Process of claim 1 wherein said partial condensing zone contains heat exchanger means wherein at least a portion of said part of the fifth fraction is introduced as cooling medium before passing into said reaction zone.

3. Process of claim 2 wherein said cooling medium condenses said third fraction and partially condenses said first fraction.

4. Process of claim 1 wherein said reaction zone comprises an alkylation reaction zone, said first component comprises an unreactive diluent, said second component comprises an alkylatable aromatic compound, and said third component comprises an alkylated aromatic compound.

5. Process of claim 1 wherein said reaction zone comprises an oligomerization reaction zone, said first component comprises an unreactive diluent, said second component comprises partially-oligomerized product, and said third component comprises oligomerized product.

6. Process of claim 5 wherein said unreactive diluent comprises propane and said oligomerized product comprises propylene-trimer.

7. Process of claim 5 wherein said unreactive diluent comprises propane and said oligomerized product comprises propylene-tetramer.

8. Process of claim 5 wherein said unreactive diluent comprises one of the group consisting of propane, butane, and a propane-butane mixture, and said oligomerized product comprises heptene.

9. Process for recovery of alkylated aromatic compounds which comprises:
   (a) passing a total alkylation effluent, comprising unreactive diluent, alkylatable aromatic compound, and alkylated aromatic compound, from an alkylation reaction zone into a flash zone maintained at a pressure in the range of from about 200 p.s.i.g. to about 500 p.s.i.g. and at a temperature in the range of from about 250° F. to about 500° F.;
   (b) withdrawing from said flash zone a first fraction comprising said diluent and alkylatable aromatic compound and a second fraction comprising alkylatable aromatic compound and alkylated aromatic compound;
   (c) passing said first fraction into a partial condensing zone maintained at a pressure in the range of from about 200 p.s.i.g. to about 500 p.s.i.g. and at a temperature in the range from about 250° F. to about 500° F.;
   (d) withdrawing from said partial condensing zone a third fraction comprising said diluent and a fourth fraction comprising alkylatable aromatic compound;
   (e) passing said second fraction and said fourth fraction into a separation zone under conditions sufficient to provide at least a fifth fraction comprising alkylatable aromatic compound and a sixth fraction comprising alkylated aromatic compound in high concentration;
   (f) passing said third fraction and at least a part of said fifth fraction into said reaction zone; and,
   (g) recovering said sixth fraction.

10. Process of claim 9 wherein said alkylatable aromatic compound comprises benzene, said unreactive diluent comprises ethane, and said alkylated aromatic compound comprises ethylbenzene.

11. Process of claim 9 wherein said alkylatable aromatic compound comprises benzene, said unreactive diluent comprises propane, and said alkylated aromatic compound comprises cumene.

12. Process of claim 9 wherein said partial condensing zone contains heat exchanger means wherein at least a portion of said part of the fifth fraction is introduced as cooling medium before passing into said reaction zone.

13. Process of claim 12 wherein said cooling medium condenses said third fraction and partially condenses said first fraction.

References Cited

UNITED STATES PATENTS

| | | | |
|---|---|---|---|
| 3,364,139 | 1/1968 | Kunesh et al. | 208—364 X |
| 3,368,966 | 2/1968 | Borst et al. | 260—683.62 X |
| 3,370,003 | 2/1968 | Borst | 260—683.62 X |
| 3,371,029 | 2/1968 | Weiland | 208—361 X |

DELBERT E. GANTZ, *Primary Examiner.*

C. R. DAVIS, *Assistant Examiner.*

U.S. Cl. X.R.

208—361, 364; 260—674, 683.62, 683.75